United States Patent [19]

Grossmann

[11] 4,242,950

[45] Jan. 6, 1981

[54] MOTOR VEHICLE HEATER AND VENTILATOR

[75] Inventor: Holger Grossmann, Ingolstadt, Fed. Rep. of Germany

[73] Assignee: Audi NSU Auto Union Aktiengesellschaft, Neckarsulm, Fed. Rep. of Germany

[21] Appl. No.: 940,163

[22] Filed: Sep. 7, 1978

[30] Foreign Application Priority Data

Sep. 22, 1977 [DE] Fed. Rep. of Germany ....... 2742670

[51] Int. Cl.$^3$ .............................................. B60H 1/02
[52] U.S. Cl. ........................................ 98/2; 98/38 B;
98/41 SV; 237/12.3 A; 237/12.3 R
[58] Field of Search .................... 237/12.3 A, 12.3 B,
237/12.3 R; 98/2.05, 2.06, 2.09, 38 B, 38 C, 38 D, 41 SV

[56] References Cited

U.S. PATENT DOCUMENTS

| | | | |
|---|---|---|---|
| 2,948,210 | 8/1960 | Conlan | 98/38 B |
| 3,376,916 | 4/1968 | Gressett | 98/38 B |
| 3,496,855 | 2/1970 | DeBoer | 98/2.06 |
| 3,659,515 | 5/1972 | Galaniuk | 98/2 |
| 3,807,631 | 4/1974 | Mohr | 237/12.3 A |
| 3,841,553 | 10/1974 | Taylor | 237/12.3 R |
| 4,108,376 | 8/1978 | Matsuda et al. | 237/12.3 B |

FOREIGN PATENT DOCUMENTS 2608053 9/1977 Fed. Rep. of Germany ........ 98/41 SV
1444950 8/1976 United Kingdom ................ 237/12.3 B

*Primary Examiner*—Henry C. Yuen
*Attorney, Agent, or Firm*—Karl F. Ross

[57] ABSTRACT

A temperature-control system for a vehicular passage compartment having a pair of sides is provided with a housing forming an elongated mixing chamber having a fresh-air inlet slot and a modified-air inlet slot each extending substantially the full length of the chamber which also has a pair of outlets each at a respective longitudinal end of the chamber. Fresh air is fed to the chamber through the fresh-air inlet slot and either heated or cooled air is fed to the chamber through the modified-air inlet slot. A conduit leads from each of the outlets to a respective side of the motor-vehicle compartment so that a mixture of temperature-modified and fresh air can be fed to the two sides of the passenger compartment. A deflector is longitudinally displaceable in the chamber along one of the inlet slots, normally the modified-air inlet slot, and partially blocks this one slot in any position therealong. Thus displacement of the deflector can vary the mix ratio of fresh air and modified air in that portion of the mixing compartment to vary the heating or cooling effect between the two sides of the motor-vehicle passenger compartment.

9 Claims, 5 Drawing Figures

MOTOR VEHICLE HEATER AND VENTILATOR

FIELD OF THE INVENTION

The present invention relates to an apparatus for ventilating while simultaneously heating or cooling a motor-vehicle.

More particularly this invention concerns such a system which delivers temperature-conditioned air—heated or cooled—to the passenger compartment along with fresh outside air.

BACKGROUND OF THE INVENTION

It is a standard practice to provide the heater of an automotive vehicle with means for mixing relatively fresh outside air with the air being heated, to ventilate the passenger compartment of the vehicle while at the same time tempering the heating effect. The ratio of the modified/fresh-air mixture is normally controlled by a flap in the heating apparatus. Such a system is also frequently employed in the summer when the vehicle is air-conditioned to replace the recirculated air in the passenger compartment so as to prevent the air in the passenger compartment from becoming too stale.

It is also known, as for example from German Pat. publications Nos. 1,753,300 and 2,141,809, to provide a pair of outlets for such a heating/ventilating apparatus, one outlet opening at the driver side of the vehicle and the other at the passenger side. Such an arrangement is provided because normally the driver is considerably more active than the passenger, so the driver wishes less heat in the water and more cooling in the summer. The systems described in these publications therefore allow individual control to at least a limited extent of the heating for the two sides of the vehicle passenger compartment.

The one system described in the publications above simply allows heated air to be diverted to one side or the other. It is not possible with this system to vary the temperature from one side to the other, merely to completely eliminate heating from one side if desired. The reduction, for example, of the heating on the driver side has the effect of simultaneously cutting back the supply of fresh air to the driver, and vice versa.

In other more complex systems it is possible to achieve an individual temperature control for each side by providing relatively complex dual heaters, so that the overall installation cost is elevated.

OBJECTS OF THE INVENTION

It is therefore an object of the instant invention to provide a relatively simple system for controlling the temperature in and ventilating the passenger compartment of a motor vehicle.

Another object is the provision of such a system which allows individualized control of the heating and ventilating effect at different locations in the passenger compartment.

Yet another object is to provide such a system which is relatively simple and which can be produced without a substantial increase in cost for the heating and/or air conditioning system.

SUMMARY OF THE INVENTION

These objects are attained in accordance with the present invention in a system having a housing forming an elongated mixing chamber having a fresh-air inlet slot and a modified-air inlet slot extending substantially the full length of the chamber, and having a pair of outlets each at a respective longitudinal end of the chamber. Fresh air is fed to the mixing chamber through the fresh-air inlet slot and temperature-modified—heated or cooled—air is fed to the mixing chamber through the modified-air inlet slot. A conduit leads from each of the outlets to a respective side of the passenger compartment of the vehicle, so that a mixture of temperature-modified and fresh air is delivered to both sides of the compartment. A deflector is longitudinally displaceable in the chamber along one of the inlets and partially blocks this one inlet slot in any position therealong. Means is provided for displacing this deflector along the one inlet slot and thereby decreasing the amount of air issuing therefrom adjacent the deflector. Thus the ratio mixture will be varied by this deflector so that the deflector in effect will in a very simple manner control the temperature of the air in that region of the mixing chamber.

According to further features of this invention the housing is provided with a passage connected to the radial output of an axial-input radial-output blower, and with means for diverting some of the air from this blower through another passage in which a continuously hot heat exchanger is provided. The coolant from the motor-vehicle engine is continuously passed through the heat exhanger or radiator in this other passage. The air not diverted from the blower through the heater is, therefore, the fresh air and the air passing through the heater is modified air. Flaps operated synchronously and provided at the inlet and the outlet of the heater passage, whose outlet constitutes the modified-air inlet, may be closed to completely shut off the heater.

According to the instant invention the deflector is constituted as a very simple slide plate having an overall length equal to at least one third and at most one half of the overall length of the inlet slots. Thus if the slide plate is moved, for example, all the way to the left-hand end over the fresh-air slot, the left-hand outlet will receive almost only temperature-modified air, whereas the right-hand side will receive the same standard mixture. As the overall pressure in the mixing chamber remains the same, however, the amount of flow to both sides of the passenger compartment will remain equal for adequate ventilation and even climate control.

According to the instant invention the slide plate moves across the inlet slot that comes from the heater or cooler. Thus, when the various flaps inside the heater are set up so that all of the fresh air entering the apparatus passes through the heater or cooler, the deflector will have no effect on the temperature of the air exiting from the apparatus. This is not disadvantageous, since whenever an extreme setting for fresh air, heat or cooling is chosen it is normally desired at all locations in the vehicle at the same time. The slide plate is provided in the temperature-modified air inlet because when the ventilation alone is desired, it is preferred that the amount of air flow be maximized, whereas less air flow can be tolerated during heating or cooling.

SPECIFIC DESCRIPTION

Figure 1:
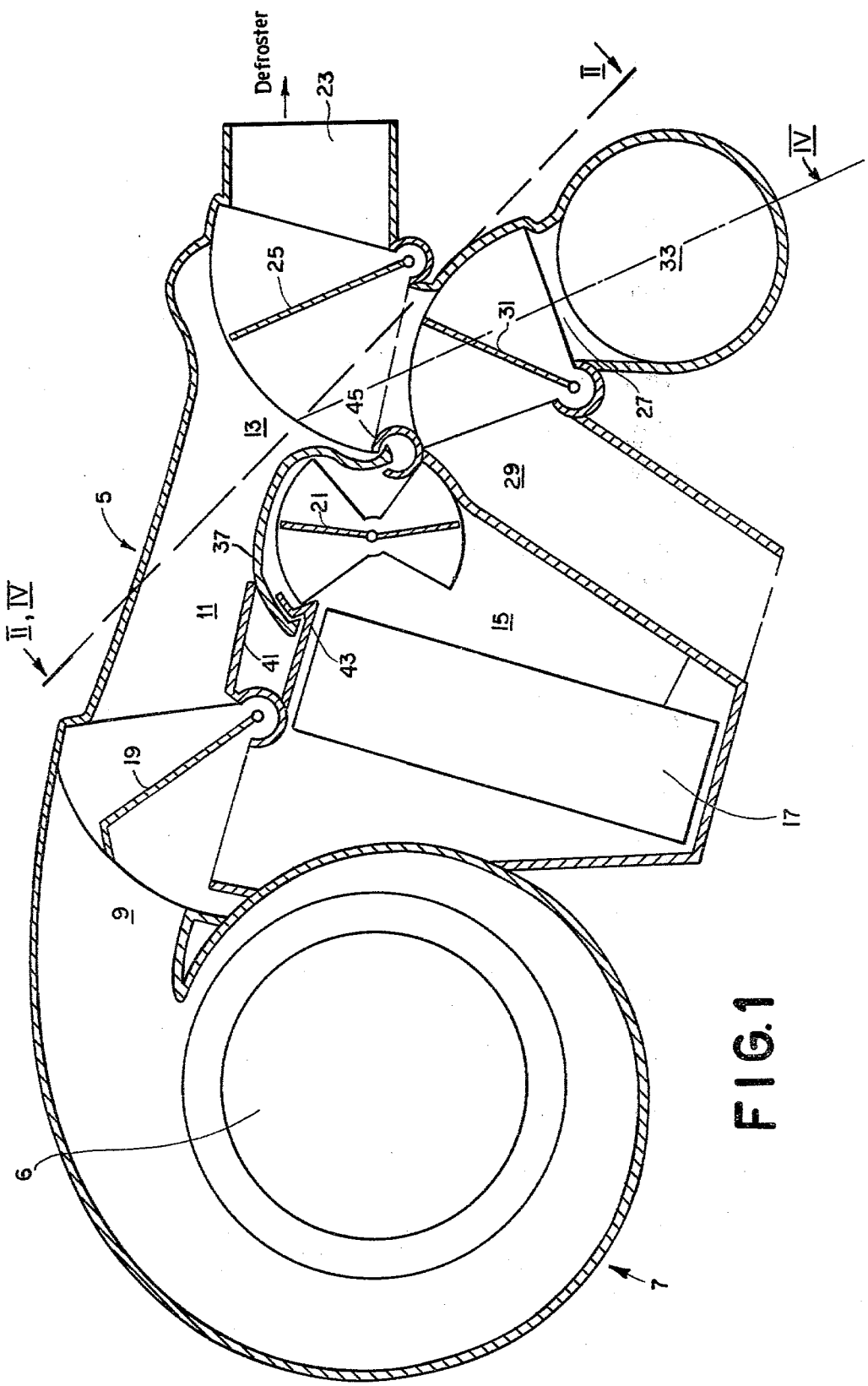
FIG. 1 is a vertical section through the apparatus according to this invention.
Figure 2:
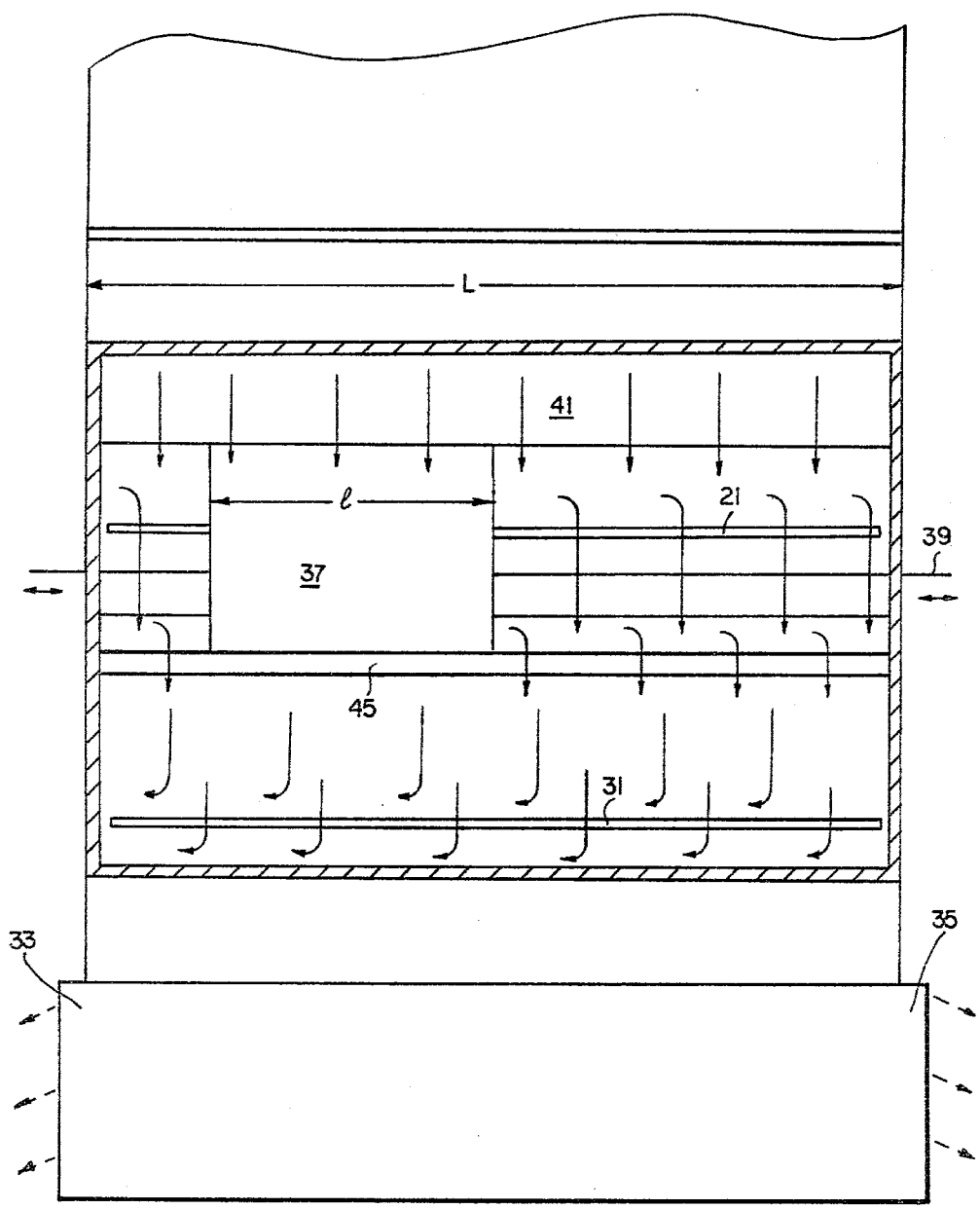
FIG. 2 is a section taken along line II—II of FIG. 1.
Figure 4:
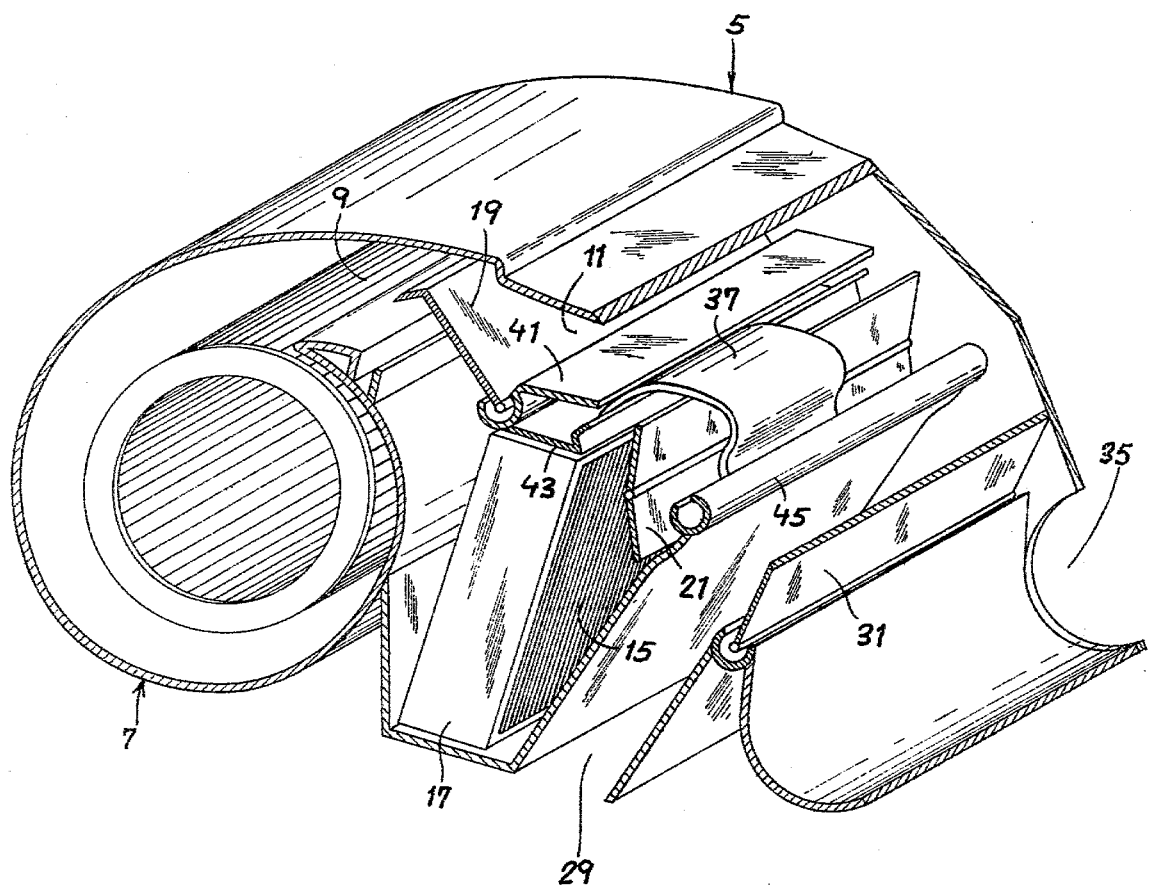
FIG. 4 is a partly sectional view taken along line IV—IV of FIG. 1.

As shown in FIGS. 1, 2, and 4 the system according to the instant invention has a housing 5 on which is mounted a squirrel-cage blower 7 whose inlet 6 draws in fresh air and whose outlet 9 projects this fresh air into a passage 11 extending horizontally along the upper part of the housing 5 and extending horizontally the full length L thereof. At its downstream end the passage 11 terminates in a mixing chamber 13 which also extends the length L of the housing 5.

A passage 15 has a downstream end opening transversely into the passage 11 at the outlet 9 and an upstream end opening upwardly into the mixing compartment 13. This passage 15 extends, once again, the full length of the housing 5 and is provided with a heat-exhange radiator 17. In the instant embodiment this radiator 17 is continuously traversed by the coolant for the engine of the vehicle so that it is hot whenever the engine has been running for any time. It is, of course, also possible to traverse this radiator 17 with a cold fluid during the summer season for air conditioning the vehicle. Alternatively an evaporator coil is provided at the inlet 6 of the blower 7, so that air can be sucked back in from the inside the passenger compartment of the vehicle through such an evaporator coil by the blower 7.

At the upstream end of the passage 15 there is provided a flap 19, and at the downstream end a flap 21. This flap 19 can swing up to divert all of the fresh air coming out of the output 9 through the passage 15, or can swing down to completely block the inlet or upstream end of the passage 15. The flap 21 can be rotated, normally synchronously with the flap 19, to block the downstream or output end of the passage 15. Both of these flaps 19 and 21 are controlled by a knob 47 shown in FIG. 3b having a pointer 48 that cooperates with a scale 46 formed as a 270° spiral that thickens in a clockwise direction. When the arrow 48 is directed at the zero end of the spiral 46 there is no heating effect, so that the flaps 19 and 21 completely cut off the heating passage 15. At the opposite end of this scale, indicated by the 100, the heating effect is maximized with the flap 19 diverting all of the fresh air from the blower 7 through the heat-exchange radiator 17. At intermediate positions the air from the blower 7 is partly diverted through the radiator 17 and partly allowed to pass through the passage 11.

At the downstream side of the mixing chamber 13 there is provided a plurality outlets 23 blockable by means of respective flaps 25 and extending upwardly to the windshield and/or side windows of the vehicle. The air exiting from these outlets 23 therefore serves for defrosting.

Below the outlets 23 there are provided at least two downwardly opening outlets 29, and at least two forwardly and downwardly opening outlets 27. Flaps 31 can vary the diversion of air between these two outlets 29 and 27. The outlets 29 therefore divert air down toward the feet of the people sitting in the motor vehicle and the outlets 27 are connected to respective conduits 33 and 35 that open at the dashboard at opposite sides of the motor vehicle.

With the system described above, therefore, a layered heating effect is achieved. The air at the top part of the passage 11 and the top of the mixing chamber 13 will always be somewhat cooler, and this air will serve mainly for defrosting. Somewhat hotter air will be deflected through the conduits 33 and 35 from the dashboard directly at the passengers, and yet hotter air will flow out through the various outlets 29 for the passengers' feet thus achieving a three-level heating effect that is very comfortable, and that ensures best ventilation and heating effect, as well as best air-conditioning effect if the device is set up for that purpose.

Figure 3A:
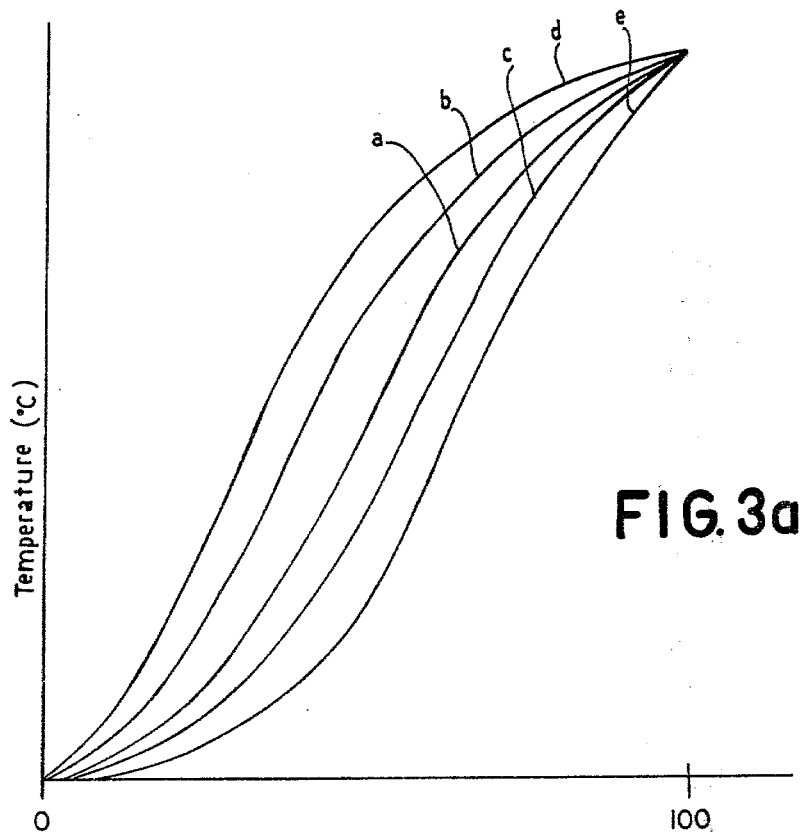
FIG. 3a is a graph illustrating the operation of the system according to this invention.
Figure 3B:
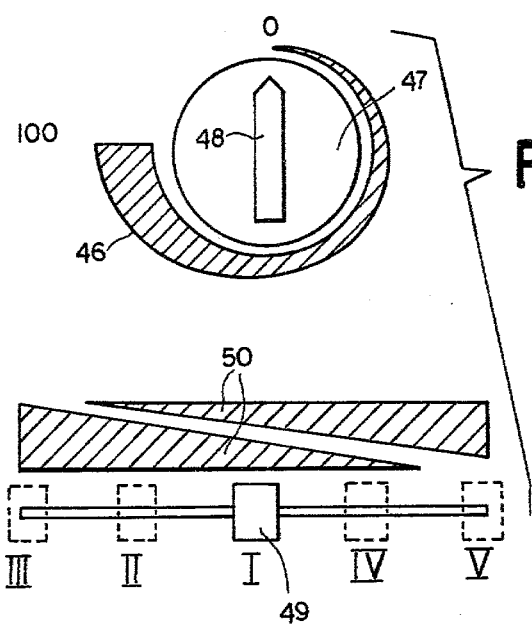
FIG. 3b is a large-scale view of the control panel according to this invention.

According to the instant invention a slide plate 37 is provided which effectively forms a continuation of the lower wall 41 of the passage 11, and which has an upstream end slidable in a rail 43 of the housing and a downstream end slidable in a rail 45 of the housing. This slide plate 37 has an overall length 1 which is equal to 0.4L, and can be displaced the full length of the housing 5 by means of a Bowden cable 39 operated by means of a slide button 49 displaceable adjacent a pair of right-triangular scales 50 as shown in FIG. 3b.

In the central position of the button 49, that is position I, the plate 37 will lie directly in the middle of the housing 5, so that it will only block the middle of the outlet slot for the heated air. Therefore the air will flow evenly to both of the conduits 33 and 35 and the heating effect will be the same in both sides of the vehicle. This is illustrated in the graph of FIG. 3a showing temperature on the ordinate and the heating effect as 0–100 on the abscissa, as indicated on the scale 46 of the button 47 of FIG. 3b. In this central position I the heating effect at both sides will be identical, as shown by graph line a in FIG. 3a, that is for a given setting of the knob 47 the heat issuing from the two vents of the heating system will be identical due to identical ratios of fresh air and heated air.

When, however, the knob 49 is shifted in one direction, as for example into position II, the heating effect on the left will increase and on the right will decrease, by shifting of the plate 37 toward the right partially blocking the right-hand side of the outlet of the heating passage 15. The effect will be that the left-hand side will be heated in accordance with graph line b of FIG. 3a and the right-hand side in accordance with graph line c.

Shifting into position III will have the corresponding effect of heating the left as shown by graph d and the right by graph line e.

In all of these positions there is no difference at the bottom ends and top ends of the heating scale, that is when no fresh air is mixed with heated air at the position 0 of the knob 47 and when the flaps 19 and 21 operated by the knob 47 are moved to divert all of the air through the heater passage 15 for maximum heating effect in position 100 of the knob 47.

The effect is, of course, symmetrical, so that in positions IV and V of the slide knob 49 the plate 37 will move the left-hand side of the heater and correspondingly will increase the heating effect on the right-hand side.

In the central position of the plate 37 there will be a somewhat lower temperature at the center of the heater housing 5 than at the two sides thereof. This can be used advantageously in systems wherein there is a central outlet duct for the heater also. As a result the heating effect will be somewhat less in the center which is normally considered desirable because the outer sides of the car are normally much cooler as a result of heat exchange through the side windows. Conversely there is virtually no difference in the summer as the slide plate 37 covers the heating duct, so that when the heating passage 15 is completely shut off and only fresh air is admitted the position of the slide plate becomes irrelevant to the distribution of fresh air. In fact the slide plate is only effective when fresh air and heated air are mixed, as during normal nonsummer use of the machine.

It is of course noted that the device can be used in an air conditioning system as described above, with the heat exchanger 17 either being operated as an evaporator coil or with an evaporator coil being provided immediately upstream of the blower 7.

I claim:

1. A temperature control system for a vehicular passenger compartment having a pair of sides, said system comprising:
    a housing forming an elongated mixing chamber having a fresh-air inlet slot and a modified-air inlet slot each elongated longitudinally of said chamber and a pair of outlets at opposite respective longitudinal ends of said chamber;
    means for feeding fresh air to said chamber through said fresh-air inlet slot;
    means for feeding temperature-modified air to said chamber through said modified-air inlet slot;
    respective conduits leading from said outlets to said sides of said vehicular passenger compartment, whereby temperature-modified air and fresh air are mixed in said chamber and the mixture is conducted from said outlets and through the respective conduits to the respective sides of said passenger compartment;
    a guide extending the full length of one of said slots;
    a slide plate substantially shorter than said guide and longitudinally displaceable therealong; and
    means for displacing said slide plate longitudinally along said guide and thereby blocking air flow out of said one slot into said mixing chamber at said slide plate over only the length thereof to increase in said mixing chamber adjacent said slide plate the proportion of air issuing from said other slot to air issuing from said one slot, whereby when said slide plate is closer to one of said longitudinal ends of said mixing chamber than to the other end thereof the temperature of the air issuing from the respective outlet will be closer to that of the air issuing from said other slot than that of the air issuing from said one slot.

2. The system defined in claim 1 wherein said means for feeding temperature-modified air includes a heater, whereby said temperature-modified air is normally hotter than said fresh air.

3. The system defined in claim 1 wherein said one slot is said modified-air inlet slot.

4. The system defined in claim 1 wherein said slide plate has a length parallel to said slots equal to at least one-third the length thereof.

5. The system defined in claim 4 wherein said chamber and slots are of substantially the same length.

6. The system defined in claim 5 wherein said means for feeding fresh air includes a blower having an output opening into said housing, said housing having means for diverting part of the air from said output through said heater.

7. The system defined in claim 6 wherein said means for diverting includes at least one flap displaceable to increase and decrease the amount of air from said output diverted through said heater.

8. The system defined in claim 5 wherein said housing includes a passage having passage walls and extending generally straightly between said output and said mixing chamber, said modified-air slot opening generally transversely into said passage, said slide plate forming a continuation of one of said passage walls.

9. The system defined in claim 1 wherein said modified-air inlet slot is below said fresh-air inlet slot.

* * * * *